(12) United States Patent
Lecoq et al.

(10) Patent No.: US 10,985,540 B2
(45) Date of Patent: Apr. 20, 2021

(54) CLAMP FOR INSERTING A FLEXURALLY ELASTIC STRAND INTO A RECEPTACLE INTENDED TO RECEIVE THE STRAND VIA AN OPENING

(71) Applicant: Orange, Paris (FR)

(72) Inventors: Daniel Lecoq, Chatillon (FR); Jean-Luc Campion, Chatillon (FR)

(73) Assignee: ORANGE, Paris (FR)

( * ) Notice: Subject to any disclaimer, the term of this patent is extended or adjusted under 35 U.S.C. 154(b) by 102 days.

(21) Appl. No.: 16/335,945

(22) PCT Filed: Sep. 26, 2017

(86) PCT No.: PCT/FR2017/052582
§ 371 (c)(1),
(2) Date: Mar. 22, 2019

(87) PCT Pub. No.: WO2018/060585
PCT Pub. Date: Apr. 5, 2018

(65) Prior Publication Data
US 2019/0222006 A1 Jul. 18, 2019

(30) Foreign Application Priority Data
Sep. 30, 2016 (FR) ...................................... 1659457

(51) Int. Cl.
*H02G 1/08* (2006.01)
*B65H 51/18* (2006.01)

(52) U.S. Cl.
CPC ............. *H02G 1/085* (2013.01); *B65H 51/18* (2013.01); *B65H 2402/414* (2013.01)

(58) Field of Classification Search
CPC .. H02G 1/085; D07B 7/162; B65H 2402/414; B65H 51/18; B65H 57/12; B25B 3/00;
(Continued)

(56) References Cited

U.S. PATENT DOCUMENTS

| 1,959,490 | A | * | 5/1934 | Mistelski | ............... | H02G 1/085 |
| | | | | | | 254/134.3 FT |
| 2,448,384 | A | * | 8/1948 | Meinzinger | ............ | A01K 91/06 |
| | | | | | | 188/65.1 |

(Continued)

FOREIGN PATENT DOCUMENTS

| DE | 2926986 A1 * | 1/1981 | ............. B25B 25/00 |
| EP | 0285699 A1 | 10/1988 | |

OTHER PUBLICATIONS

International Search Report dated Dec. 8, 2017 for corresponding International Application No. PCT/FR2017/052582, filed Sep. 26, 2017.

(Continued)

*Primary Examiner* — Matthew P Travers
(74) *Attorney, Agent, or Firm* — David D. Brush; Westman, Champlin & Koehler, P.A.

(57) ABSTRACT

A clamp for inserting an elastic strand into an opening of a receptacle. The clamp includes a longitudinal housing capable of housing a segment of the strand and through which the strand may slide. The clamp further includes: a blocking element including a first portion of the housing, the blocking element deforming a first portion of the housed segment when an external pressure is applied to the blocking element, the elastic force of the strand returning the first portion of the segment to its initial shape when the external pressure is no longer applied, the sliding of the strand being blocked by the bending deformation of the first portion of the housed segment; a guide including a second portion of the housing, the guide at least partially surrounding a second portion of the housed segment, and configured to guide the clamp in the direction of the opening in the receptacle.

9 Claims, 4 Drawing Sheets

(58) Field of Classification Search
CPC .... B25B 5/02; B25B 5/04; B25B 5/06; B25B 5/14; B25B 5/16–5/163; B25B 7/00; B25B 7/02; B25B 7/04; B25B 9/00; B25B 25/00; A45C 13/1046; A45C 2013/1061; Y10T 29/5369; Y10T 29/53943
USPC .............................................. 24/712.5–712.8
See application file for complete search history.

(56) References Cited

U.S. PATENT DOCUMENTS

| | | | | |
|---|---|---|---|---|
| 3,312,128 | A * | 4/1967 | Wasson | E04G 21/122 81/487 |
| 3,549,128 | A | 12/1970 | Homiak et al. | |
| 3,789,484 | A | 2/1974 | Morgan | |
| 4,819,911 | A * | 4/1989 | Cielker | H02G 1/085 254/134.3 FT |
| 5,431,370 | A * | 7/1995 | Verkuylen | H02G 1/085 254/134.3 FT |
| 5,544,926 | A * | 8/1996 | Ravencroft | B25B 9/00 294/217 |
| 5,806,902 | A * | 9/1998 | Kliest | F16G 11/101 24/136 R |
| 6,698,979 | B1 * | 3/2004 | Ambrose | G02B 6/504 37/367 |
| 7,104,287 | B1 * | 9/2006 | Schmitz | H01R 43/28 140/117 |
| 2003/0173555 | A1 | 9/2003 | Supkis et al. | |
| 2007/0270755 | A1 * | 11/2007 | Von Oepen | B25B 9/00 604/164.13 |
| 2016/0032950 | A1 * | 2/2016 | Owens | F16B 2/10 435/289.1 |

OTHER PUBLICATIONS

Written Opinion of the International Searching Authority dated Dec. 8, 2017 for corresponding International Application No. PCT/FR2017/052582, filed Sep. 26, 2017.
English translation of the Written Opinion of the International Searching Authority dated Dec. 8, 2017 for corresponding International Application No. PCT/FR2017/052582, filed Sep. 26, 2017.

* cited by examiner

Fig 1

CLAMP FOR INSERTING A FLEXURALLY ELASTIC STRAND INTO A RECEPTACLE INTENDED TO RECEIVE THE STRAND VIA AN OPENING

CROSS-REFERENCE TO RELATED APPLICATIONS

This Application is a Section 371 National Stage Application of International Application No. PCT/FR2017/052582, filed Sep. 26, 2017, which is incorporated by reference in its entirety and published as WO 2018/060585 A1 on Apr. 5, 2018, not in English.

1. FIELD OF THE INVENTION

The application lies in the field of the installation of cables of fairly small dimensions so as to be able to be manipulated by hand. In particular, it relates to a tool for manipulating a flexurally elastic strand, for example a cable or a draw cable, with the aim of inserting the strand into a receptacle which may be a tube, or a storage reel.

2. PRIOR ART

In order to insert a strand manually into a receptacle such as a tube or a reel, a person has to hold the strand in their hand at a certain distance from the orifice of the receptacle, this distance corresponding to an insertion length, exert a certain pressure on the held strand in order to prevent it from slipping in the hand, move the hand toward the orifice in order to enter the length of strand into the latter by pushing thereon, and then release the strand in order to reposition the hand at the same distance from the orifice corresponding to an insertion length, and so on.

The insertion of a strand into any kind of receptacle is an operation that is difficult to carry out with a bare hand, since the strand meets slight resistance on insertion into the receptacle, or if the total length of the strand to be inserted is long.

Clamps exist for making this operation easier, for example the one described in the European patent EP0285699, which comprises a grip that traps a segment of strand in a groove.

The pressure exerted by the hand needs to be enough to block the section of strand in the clamp. Since slipping of the strand in the groove is not necessarily perceptible, a person will tend to exert more pressure than necessary in order to be certain of preventing this slippage, this being tiring over a long period of time.

During repeated operations of repositioning the clamp along the strand after the insertion of each length, a mechanism provided with a spring is often necessary to allow easy opening of the clamp.

In addition, for an effective insertion operation, the insertion length needs to be long, or the movement has to be repeated quickly. However, if the length is too long, or if the movement is too quick, the clamp cannot prevent the strand from bending rather than entering the orifice, thus risking damaging or even breaking the strand.

One of the aims of the invention is to remedy these drawbacks of the prior art.

3. SUMMARY OF THE INVENTION

The invention aims to improve the situation with the aid of a clamp for inserting a flexurally elastic strand through an orifice of a receptacle, the clamp comprising a longitudinal housing which is able to accommodate a segment of the strand and in which the strand can slide, the clamp also comprising:

a blocking means comprising a first part of the housing, the blocking means flexurally deforming a first part of the accommodated segment when an external pressure is applied to the blocking means, the elastic force of the strand returning the first part of the segment to its initial shape when the external pressure is no longer applied, the strand being prevented from sliding by the flexural deformation of the first part of the accommodated segment, a guide means comprising a second part of the housing, the guide means at least partially surrounding a second part of the accommodated segment and being configured to guide the clamp in the direction of the orifice of the receptacle.

When the first part of the segment that is accommodated in the clamp is kept flexurally deformed, the strand can no longer slip longitudinally in the clamp. The pressure necessary to block the strand is thus that which is sufficient to deform the strand. This necessary pressure is very easy for the operator to monitor visually, since it corresponds to a movement of the blocking means. By contrast, according to the prior art, the pressure that prevents any longitudinal slippage of the strand is compression of the strand over a segment that is left rectilinear, that is to say without being deformed, and thus without any movement, perceptible to the naked eye, of the blocking means between a contact position without applied pressure and a pressing position.

In addition, since the guide means surrounds the strand over a second part of the segment accommodated in the clamp, this second part, which is not held by the blocking means, is all the same prevented from bending when the clamp with the blocked strand is pushed toward the orifice, even if strong resistance is encountered upon insertion through the orifice. By positioning the free end of the guide means in contact with the orifice, this amounting to making the insertion length correspond to the length of the guide means, or, in other words, to the length of the part of the strand segment contained in the guide means, the insertion movement effected length by length can be repeated very quickly by the operator without any fear of bending the strand.

Finally, since the strand is flexurally elastic, it returns to its, generally rectilinear, initial shape as soon as the pressure on the blocking means is removed, thereby allowing the strand to slide freely in the housing of the clamp, without a specific mechanism being necessary to free the strand from the blocking means, such as a spring. Thus, the clamp can be repositioned easily to its starting point after the insertion of a length of strand, without a particular effort being necessary to loosen the clamp.

By virtue of the invention, the insertion operation is thus rendered more efficient.

According to one aspect of the invention, the blocking means comprises a fixed lower jaw, comprising the first part of the housing, and a movable upper jaw, able to at least partially enter the first part of the housing in order to cover the first part of the accommodated segment, the upper jaw having a nonrectilinear profile so as to impress a nonrectilinear shape on the first part of the accommodated segment when the jaws are moved together.

In order to impress a nonrectilinear shape on a flexible strand, all that is necessary is for a pressure to be applied to the bottom and top thereof at several contact points disposed alternately under and over the strand. It will be understood that, by disposing the lower contact points on the lower jaw and the upper points on the upper jaw, a large number of jaw profiles are possible. For example, a sinusoidal shape has the advantage of distributing the pressure over the lower and upper surfaces of the strand. By contrast, a sawtooth shape, although it risks damaging the strand on account of the concentration of the pressure exerted on the surfaces of the strand over a small number of points, has the advantage of being very easy to manufacture.

According to one aspect of the invention, the blocking means is actuated by a pressure exerted by a hand clasping the two jaws.

In order to minimize the effort to be exerted by the operator of the clamp, the jaws are dimensions so as to be held together in a hand of ordinary size, preferably in the palm. Thus, all that is necessary is to close the hand in order to actuate the blocking means. In addition, the sensitivity of the hand means that the movement of the jaws toward one another is detected very easily. It is thus easy for the operator not only to know when the blocking means is actuated but also to regulate the force necessary without tiring.

By releasing the hand pressure, the jaws move apart in a movement detected by the sensitivity of the hand. The operator thus knows that the strand has become rectilinear again, that it is no longer blocked and that it can thus slide in the clamp.

According to one aspect of the invention, the upper jaw can take up at least one position moved away from the lower jaw, in which the housing is open.

By moving apart the jaws a little more than necessary in order for the strand to return to its rectilinear shape, the opening of the housing of the clamp becomes entirely free, making it possible to remove the strand segment from the clamp at the end of the insertion operation, or to house the strand segment in the strand at the start of the insertion operation.

According to one aspect of the invention, the upper jaw is joined to the clamp by a hinge.

Advantageously, a hinge ensures the alignment of the jaws opposite one another.

According to one aspect of the invention, the upper jaw is joined to the clamp by a flexible membrane.

Advantageously, the membrane and the jaws can form a single part. For example, this part can be made of a plastics material having properties such that the jaws are sufficiently hard, and the membrane, being thin, is sufficiently flexible to allow the movement of the upper jaw with respect to the lower jaw.

According to one aspect of the invention, the upper jaw fits into the lower jaw in the manner of a piston.

Advantageously, the upper jaw is a separate part from the rest of the clamp, and a joining part, such as a hinge or a membrane, is not necessary. It acts in the manner of a piston in the lower jaw, which forms, with at least a part of the opening of the housing, the skirt of the piston. In order to avoid a situation in which the operator loses the upper jaw, which is detachable, it can be joined to the clamp by a chain or a cord, however.

According to one aspect of the invention, the guide means is a guide tube.

Advantageously, the part of the housing that is not contained in the blocking means is contained in the guide means, which is in the shape of a tube. Thus, the length of the clamp that is not occupied by the blocking means serves as a guide tube for the clamp.

According to one aspect of the invention, the outside diameter of the guide tube is designed for the tube to enter through the orifice of the receptacle.

Advantageously, the guide tube can slide in the orifice of the receptacle. Thus, the insertion length of the strand corresponds approximately to the length of the guide tube.

According to one aspect of the invention, the receptacle is a tube for receiving the strand, and where the inside diameter of the guide tube is designed for the receiving tube to slide in the guide tube.

Advantageously, the guide tube is designed for the clamp to wind a strand into a receptacle, for example a paying-out device extended by a starting tube for making it easier to introduce the strand into a sheath when it exits the paying-out device. The starting tube of the paying-out device constitutes the receiving tube of the receptacle within the meaning of the invention. After the strand has been used as a draw cable in a sheath, for example, the clamp having an inside diameter of the guide tube designed in such a way, i.e. slightly greater than the outside diameter of the receiving tube, is capable of winding the strand into this type of receptacle. The insertion length of the strand corresponds approximately to the length of the guide tube.

According to one aspect of the invention, the opening in the second part of the housing is a longitudinal slot in the guide tube, not parallel to the guide tube.

Advantageously, since the slot is not parallel to the guide tube, it is not parallel to the housing or to the accommodated strand, either. The accommodated strand thus cannot exit the housing by accident during the operation of insertion length by length. Only an express manipulation on the part of the operator can force the strand to be positioned opposite the slot in order to exit through the opening.

According to one aspect of the invention, the slot follows a spiral along at least a part of the length of the guide tube.

Advantageously, the spiral shape makes it possible to insert one end of the strand into the guide tube by twirling the clamp around the strand, without having to deform the strand.

According to one aspect of the invention, the slot follows a sinusoidal shape along at least a part of the length of the guide tube.

Advantageously, the sinusoidal shape, if it is not very pronounced, makes it possible to easily push one end of the strand into the guide tube, deforming it slightly so that it takes on the shape.

The invention also relates to a large number of other suitable shapes for the slot, which are not parallel to the guide tube.

The various aspects of the clamp that have just been described can be implemented independently of one another or, in some cases, in combination with one another.

The invention also relates to a method for inserting a flexurally elastic strand through an orifice of a receptacle with the aid of a clamp as has just been described, comprising a step of positioning a strand segment in a housing of the clamp, and at least one iteration of inserting a length of strand comprising the following steps of:

applying a hand pressure to a blocking means, having the effect of blocking the strand in the clamp by deforming a part of the strand segment, bringing one end of a guide means into contact with the orifice of the receptacle, moving the clamp and the orifice together over a distance corresponding to the effective length of the guide means and the insertion length, releasing the pressure on the blocking means, having the effect of allowing the strand to slide without the housing being opened, repositioning by moving the clamp away from the orifice over a distance corresponding to the insertion length.

4. PRESENTATION OF THE FIGURES

Other advantages and features of the invention will become more clearly apparent from reading the following description of a particular embodiment of the invention, given by way of simple illustrative and nonlimiting example, and the appended drawings, in which.

5. DETAILED DESCRIPTION OF AT LEAST ONE EMBODIMENT OF THE INVENTION

In the rest of the description, examples of a number of embodiments of the invention according to different aspects will be presented, but the invention can be realized with different forms.

The term strand is used to denote the filiform object to be inserted into a receptacle by virtue of the clamp according to the invention. The clamp according to the invention can be used for all types of flexurally elastic filiform objects. It will be understood that the term strand encompasses for example electric cables, optical cables, or draw cables, of any material, having this mechanical characteristic of flexural elasticity.

Several views of one and the same example of a clamp, according to a first embodiment of the invention, are presented in FIGS. 1, 2, 3 and 4, wherein the references used are the same.

The clamp 1 has a longitudinal shape and is passed through along its entire length by a housing 2 for a strand, from a first opening of the housing 2 to an end of the clamp at a second opening at the other end. When it is accommodated in this housing 2, the strand can thus protrude from both ends.

The clamp 1 is made up of two aligned main parts, both of which are passed through by the housing 2.

one part comprising a blocking means 3, and
one part comprising a guide means 4.

The guide means 4 is in the form of a tube in the examples illustrated, and is referred to as guide tube below. However, other embodiments are possible with other forms for the guide means 4, depending on the type of opening of the receptacle into which the strand is intended to be inserted.

The blocking means 3 is made up of two jaws 3a and 3b that are joined by a hinge 5. This hinge can be replaced by any other means that is able to guide the upper jaw 3b toward the lower jaw 3a. The lower jaw 3a is fixed and secured to the guide tube 4, with which it can form a single part, while the upper jaw 3b is movable with respect to the rest of the clamp 1.

The part 2a of the housing that is located in the blocking means 3 is in the lower jaw 3a and comprises an opening facing the upper jaw 3b.

This opening of the housing 2 is continued in the form of a slot 6 along the entire length of the part 2b of the housing that is located in the guide tube 4.

Figure 1:
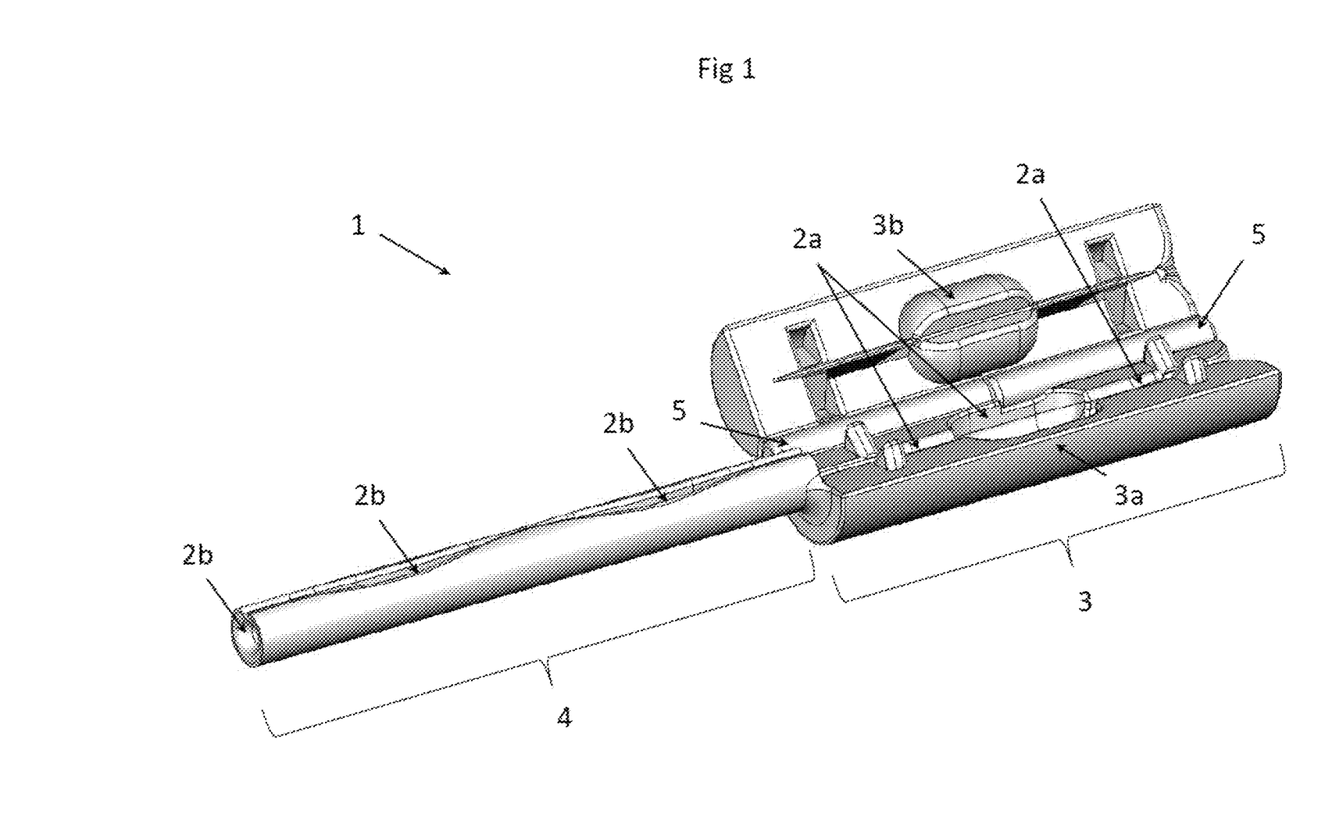
FIG. 1 shows a first view of the clamp, in an open position, according to one aspect of the invention.
Figure 2:
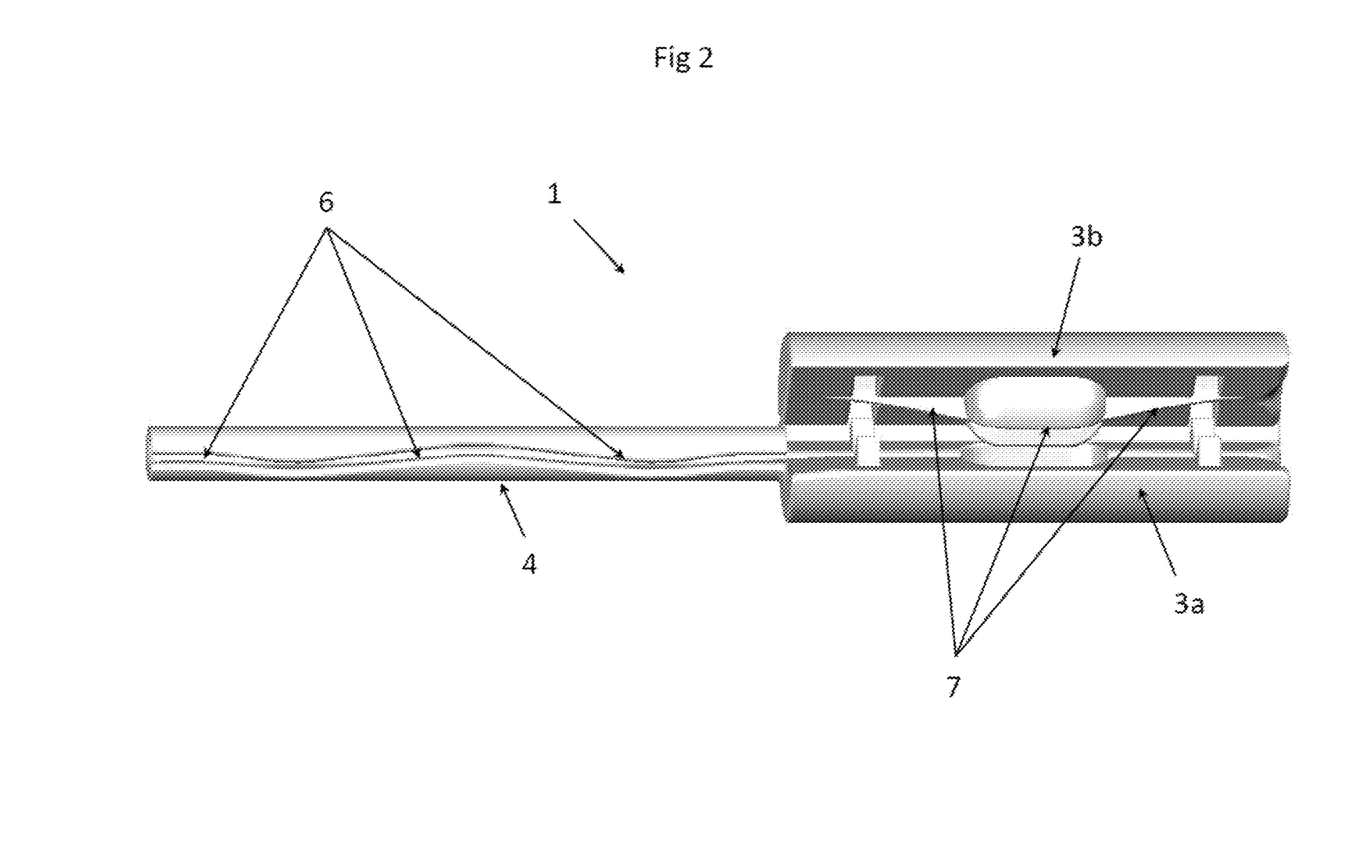
FIG. 2 shows a second view of the clamp, in an open position, according to one aspect of the invention.

Through this opening, an operator can easily place a flexurally elastic strand in the housing 2. Once accommodated, the strand can slide in the housing without exiting the latter. Specifically, in the blocking means 3, all that is necessary is to move the upper jaw 3b toward the lower jaw 3a in order to close the opening of the housing 2 in its part 2a. In the guide tube 4, one particularity of the slot 6 is that it is not parallel to the housing 2b. The strand, which, for its part, is parallel to the housing 2a once it has been inserted therein by the operator through the slot 6 by deforming it slightly, may thus no longer exit the latter except for by a reverse operation by the operator involving a similar deformation. The slot 6 can be rectilinear without being parallel, for example take on the form of a slight spiral starting from the opening of the part 2a to the junction thereof with the part 2b of the housing 2, meeting the free end of the guide tube 4, encircling the latter. The slot 6 can also be sinusoidal without encircling the guide tube 4, as shown in FIG. 2.

Figure 3:
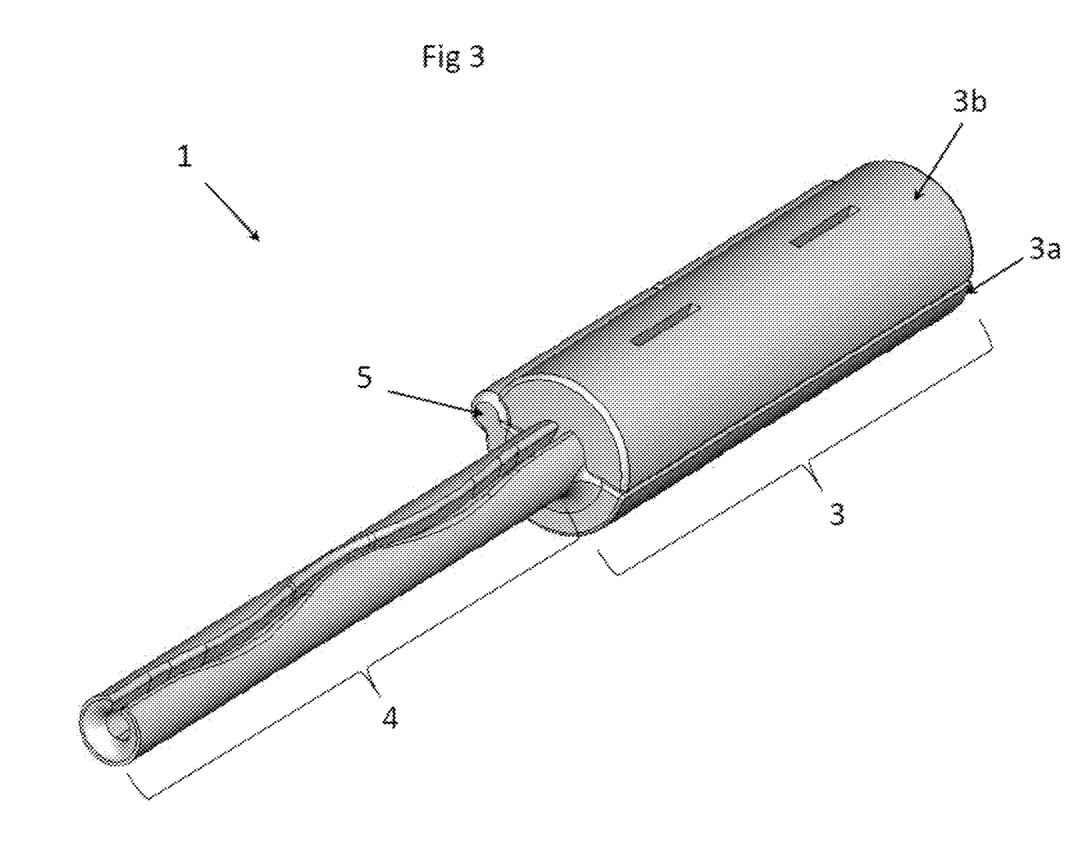
FIG. 3 shows a third view of the clamp, in a closed position, according to one aspect of the invention.
Figure 4:
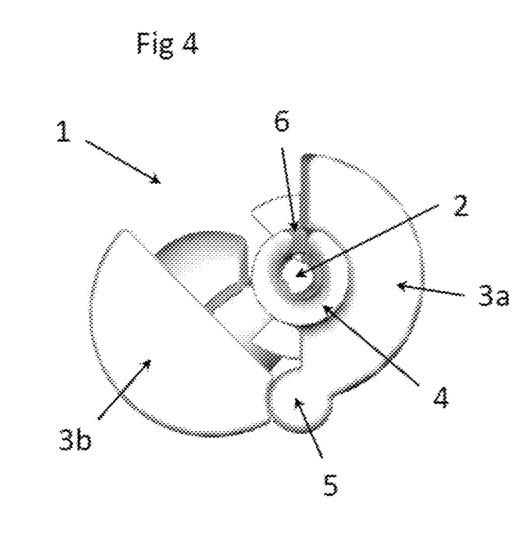
FIG. 4 shows a fourth, axial, view of the clamp in an open position, according to one aspect of the invention.

Once the strand is accommodated in the clamp, it can slide as long as the blocking means is only partially closed, that is to say as long as the jaws 3a and 3b are sufficiently far apart for the housing 2 to remain rectilinear along its entire length, including in its part 2a. FIGS. 2 and 4 illustrate such a position of the jaws partially closed. In order to control the closure of the blocking means 3, the operator places the two jaws 3a and 3b in the palm of his hand. In their partially or completely closed positions, the jaws take on a substantially cylindrical shape, ergonomically adapted to manipulation in one hand. FIG. 3 clearly illustrates this cylindrical shape of the blocking means 3 of the clamp 1 when it is in the closed position.

When the operator completely closes the blocking means 3, that is to say when he moves the two jaws together as far as possible by closing his hand, the strand is blocked and cannot slide, since the housing 2 in which it is accommodated is no longer rectilinear. Specifically, the contact surface 7 of the upper jaw 3b with the strand has a nonrectilinear profile which pushes a segment of the strand to the bottom of the lower jaw 3a by flexurally deforming it. In this embodiment, the profile is sinusoidal but other shapes are possible, for example a sawtooth shape. It is preferable but not obligatory for the profile of the contact surface of the lower jaw 3a to be identical, in order that the two jaws touch the strand in the deformed segment, this having the advantage of increasing the force blocking the strand in the clamp 1 in the closed position. Another way of increasing the blocking force is to increase the adhesion of the contact surface of at least one of the jaws, by way of an appropriate material, for example rubber.

When the operator opens his hand, the jaws become free to move apart from one another again. The elastic force of the strand tends to return it to its rectilinear shape, this having the effect of pushing the upper jaw 3b away from the lower jaw 3a. The housing 2 becomes rectilinear again along its entire length, including in its part 2a, and the strand can again slide in the clamp.

The operator can thus alternate very quickly between a position in which the strand is blocked in the clamp and a position in which it slides freely, simply by holding the blocking means of the clamp in the palm of his hand and by clamping or loosening the clamp without letting it go, this being one of the easiest and least tiring muscular movements for the human body.

By virtue of the guide tube 4, it becomes very easy to insert the strand into a receptacle, by coordinating the alternate clamping and releasing movement of the palm of the hand with a back and forth movement toward the orifice of the receptacle.

Specifically, the tubular shape of the guide means 4 makes it possible to slide the clamp 1 with respect to the orifice of the receptacle, thereby avoiding a situation in which a part of the strand located between the clamp and the receptacle is in the open when the strand is pushed toward the receptacle, in which case there would be a risk of this part of the strand bending, or even breaking.

There are at least two variant embodiments of the guide tube 4, depending on whether the guide tube 4 enters the receptacle (first variant) or whether the receptacle enters the guide tube 4 (second variant). In the second variant, the receptacle is also a tube, referred to as insertion tube in order to distinguish it from the guide tube. An insertion tube is for example a sheath intended to receive a cable if the strand is a cable, or a draw cable starting tube if the strand is a draw cable.

In the first variant, the outside diameter of the guide tube 4 needs to be slightly less than that of the orifice of the receptacle in order to slide easily therein.

In the second variant, the inside diameter of the guide tube 4, that is to say the inside diameter of the part 2b of the housing 2 that is in the guide tube, needs to be slightly greater than the outside diameter of the insertion tube, in order that the latter slides easily therein.

For these two variants, the length by length insertion process is similar. An insertion length corresponds to the length of the sliding movement of the guide tube 4 in the orifice of the receptacle, or of the sliding movement of the orifice of the insertion tube in the guide tube 4, depending on the variant. It will be understood that this insertion length can then be as long as the guide tube 4.

Once the strand has been accommodated in the housing 2 of the clamp 1 by opening and then closing the blocking means 3, the operator grasps the blocking means 3 in the palm of his hand and positions the free end of the guide tube 4 in the orifice of the receptacle, or he positions the orifice of the insertion tube in the free end of the guide tube 4, depending on the variant.

Then, he effects a back and forth movement along the insertion length, by closing his palm in the direction of the orifice and opening his palm in the opposite direction. This gesture is very similar to the one applied to a bicycle pump to inflate a tire. On each movement, a strand length corresponding to the insertion length is thus inserted into the receptacle. By virtue of the guide means 3 and the blocking means 4 of the clamp 1 according to the invention, it will be understood that, during each insertion movement, the strand cannot bend, even if it encounters resistance in the receptacle.

Figure 5:
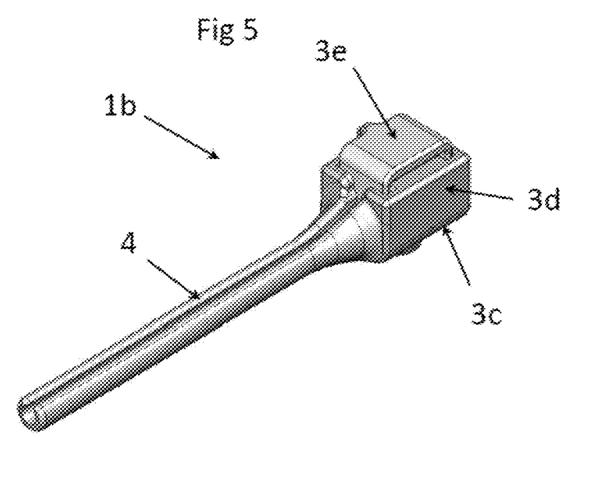
FIG. 5 shows a view of the clamp according to another embodiment of the invention.

FIG. 5 shows a view of a clamp according to another embodiment of the invention.

The clamp 1b differs from the clamp 1 by way of the blocking means 3c. The blocking means 3c also comprises a lower jaw 3d forming a single part with the guide means 4, and a movable upper jaw 3e, but the latter is not joined to the lower jaw 3d by a hinge or a flexible membrane. In this embodiment, the upper jaw 3e is a separate part of the clamp that is designed to slide in the opening of the lower jaw 3d, in the manner of a piston in its skirt. In order to open the clamp and accommodate the strand, all that is necessary is to completely remove the upper jaw 3e from the clamp. A chain or a cord (not illustrated) can be added between the upper jaw 3e and the clamp in order to avoid the loss of the small part that forms the upper jaw 3e. This embodiment may be suitable for a small model of clamp, in which a hinge would be more fragile. In such a model of a clamp that is suitable for strands of small cross section, the blocking means can be held between the fingers rather than in the palm of the hand, for example with the thumb positioned on the upper jaw 3e and one or more fingers positioned under the lower jaw 3d.

The components of the clamp according to the invention, and the total length thereof, can effectively be dimensioned and adapted easily depending on the dimensions and the cross-sectional shape of the strand to be inserted. In particular, the width of the housing 2 depends on the width of the strand, and the shape of the housing 2 may be configured in a substantially circular or substantially rectangular manner, depending on whether the strand has a circular or more flattened cross section.

The invention claimed is:

1. A clamp for inserting a flexurally elastic strand through an orifice of a receptacle, the clamp comprising:
   a longitudinal housing which is able to accommodate a segment of the strand and in which the strand can slide;
   a blocking element comprising a first part of the housing, a fixed lower jaw and a movable upper jaw, the upper jaw fitting into an opening in the lower jaw in the manner of a piston, the upper jaw being a separate part of the clamp and configured to be completely removed from the clamp in order to let the strand in or out of the housing when the upper jaw is removed from the clamp, the upper jaw having a non rectilinear profile so as to impress a non rectilinear shape on a first part of the segment accommodated in the first part of the housing when the jaws are moved together, the first part of the housing allowing a rectilinear passageway for the strand when the jaws are moved apart, and preventing a rectilinear passageway for the strand when the jaws are moved together; and
   a guide comprising a second part of the housing, the guide at least partially surrounding a second part of the accommodated segment and being configured to guide the clamp in the direction of the orifice of the receptacle.

2. The clamp as claimed in claim 1, wherein the upper jaw can take up at least one position moved away from the lower jaw, in which the housing is open.

3. The clamp as claimed in claim 1, wherein the guide is a guide tube.

4. The clamp as claimed in claim 3, wherein an outside diameter of the guide tube is designed for the tube to enter through the orifice of the receptacle.

5. The clamp as claimed in claim 3, wherein the receptacle is a tube for receiving the strand, and wherein an inside diameter of the guide tube is designed for the receptacle tube to slide in the guide tube.

6. The clamp as claimed in claim 3, wherein an opening in the second part of the housing is a longitudinal slot in the guide tube, not parallel to the guide tube.

7. The clamp as claimed in claim 6, wherein the slot follows a spiral along at least a part of a length of the guide tube.

8. The clamp as claimed in claim 6, wherein the slot follows a sinusoidal shape along at least a part of a length of the guide tube.

9. A method comprising:
inserting a flexurally elastic strand through an orifice of a receptacle with the aid of a clamp, which comprises:
a longitudinal housing which is able to accommodate a segment of the strand and in which the strand can slide;
a blocking element comprising a first part of the housing, a fixed lower jaw and a movable upper jaw, the upper jaw fitting into an opening in the lower jaw in the manner of a piston, the upper jaw being a separate part of the clamp in order to let the strand in or out of the housing when the upper jaw is removed from the clamp, the upper jaw having a non rectilinear profile so as to impress a non rectilinear shape on a first part of the segment accommodated in the first part of the housing when the jaws are moved together, the first part of the housing allowing a rectilinear passageway for the strand when the jaws are moved apart, and preventing a rectilinear passageway for the strand when the jaws are moved together; and
a guide comprising a second part of the housing, the guide at least partially surrounding a second part of the accommodated segment and being configured to guide the clamp in the direction of the orifice of the receptacle wherein the inserting comprises:
  a step of removing the upper jaw from the clamp,
  a step of positioning the segment of the strand in the housing of the clamp,
  a step of inserting the upper jaw into the lower jaw, and
  at least one iteration of inserting a length of strand, called an insertion length, comprising the following steps:
    applying a pressure to the upper jaw with one finger, having the effect of blocking the strand in the clamp by deforming the first part of the strand segment,
    bringing one end of the guide into contact with the orifice of the receptacle,
    moving the clamp and the orifice closer together over a distance corresponding to an effective length of the guide and the insertion length,
    releasing the pressure on the blocking element, having the effect of allowing the strand to slide without the housing being opened, and
    repositioning by moving the clamp away from the orifice over a distance corresponding to the insertion length.

* * * * *